Figure 1:
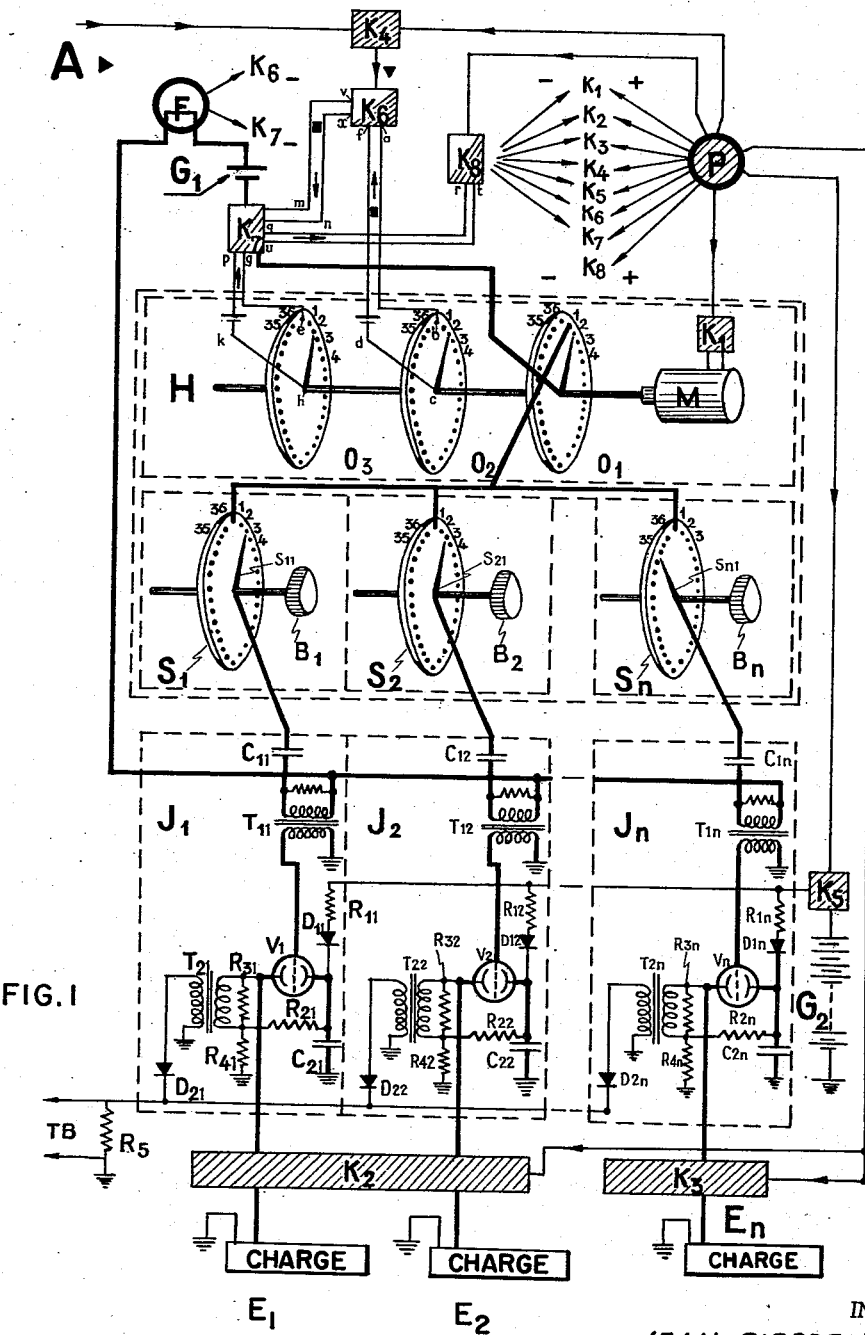

May 12, 1964 JEAN-PIERRE FAIL ETAL 3,133,231
CONTROL DEVICE FOR TIME-SPACED SEISMIC SHOTS
Filed Dec. 1, 1961 2 Sheets-Sheet 1

INVENTORS
JEAN-PIERRE FAIL
PHILIPPE RICKLIN
BY *Toulmin & Toulmin*
ATTORNEYS

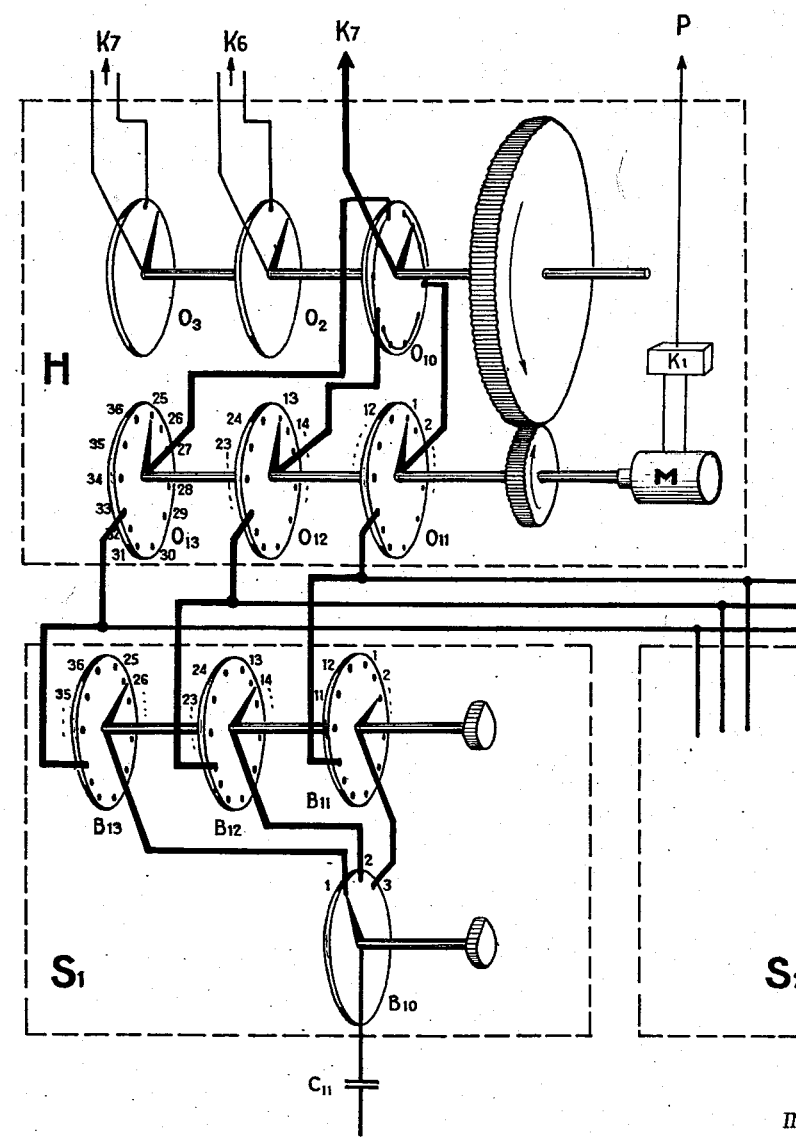
Fig: 2

United States Patent Office 3,133,231
Patented May 12, 1964

3,133,231
CONTROL DEVICE FOR TIME-SPACED
SEISMIC SHOTS
Jean-Pierre Fail, Paris, and Philippe Ricklin, Rueil-
Malmaison, France, assignors to Institut Francais
du Petrole, des Carburants et Lubrifiants, Rueil-
Malmaison, France
Filed Dec. 1, 1961, Ser. No. 156,382
Claims priority, application France Dec. 5, 1960
6 Claims. (Cl. 317—80)

The present invention relates to a control device for the time-controlled firing of seismic shots carried out at different locations.

Up to the present, the generally used seismic methods only comprise the carrying out of a single seismic shot. This single shot could be effected for instance by means of detonating a charge placed into ground at a certain depth.

This method suffers from the drawback that, at the point of arrival of the waves produced by the explosion they are superimposed by parasitic waves due to external disturbances or even resulting from the explosion itself. Accordingly, the recognition of the electric waves generated by the explosion is made difficult.

In order to attenuate the parasitic waves it may be advantageous to realise the simultaneous shot of a plurality of detonating charges placed at different locations which are selected so as to substantially cancel the effect of the parasitic waves by the superposition effect of the waves being in phase opposition at their arrival at the receivers.

However, such a method requires very large areas for the location of the different detonating charges.

Another method for avoiding this drawback while simultaneously substantially cancelling the effect of the parasitic waves consists of carrying out time-spaced shots at predetermined time intervals. It may also be of advantage to effect time-spaced shots at different locations.

Up to now such time-spaced shots could be effected only by means of pyrotechnical relays or by time-lag detonators which were necessary to realizing the time-spacing of successive shots since all the shots were triggered by a single control, i.e. in the same way as is the case of a plurality of simultaneous shots.

Such a method for generating time-spaced shots suffers from the drawback of providing only for very short time lags between the successive explosions and moreover is very complex and costly.

It is, therefore, an object of the present invention to generate time-spaced shots at different locations being preselected so as to substantially cancel the effect of the parasitic waves at the point of receiving the elastic waves generated by the shots.

It is another object of this invention to provide means for generating a plurality of shots succeeding each other at equal or different predetermined time-intervals.

It is a still further object of this invention to provide means for controlling each shot in a series of a plurality of successive shots.

These and other objects as may be apparent from the following description and claims, are achieved by means of a control device according to the present invention and comprising essentially:

(1) A set of control knobs and relays;
(2) A clock providing for a time scale;
(3) A group of selectors providing for the setting of the time at which each shot will occur, and
(4) A group of elementary or basic firing units each providing charge-trigger-actuation by means of a current of high intensity fed to an electric detonator used for generating the shot.

By means of the firing control device according to the invention, shots or groups of shots may be generated at any predetermined time intervals, either equal or different from one another, provided that all the time intervals are a multiple of a common time unit given by the clock. It may be possible, for instance, to generate groups of shots at time intervals comprised, by way of example, between 5 and 180 milliseconds. Any combination of time delays between shots may be realized by means of the firing control device according to this invention, including zero time delays corresponding to the simultaneous firing of all the groups of detonating charges or of a certain number of these groups.

Moreover, the firing control device according to this invention provides means for modifying at will, when desired, the selection of the time for each shot, without requiring any change in the connection of the control firing circuit.

This invention will be further explained more in detail with reference to the accompanying drawings, illustrating by way of example a particular embodiment of the invention, wherein:

FIGURE 1 shows the general assembly of the control firing box according to a first embodiment of this invention and FIGURE 2 illustrates a modified embodiment of the time-delay preselection device of that part of FIGURE 1 including rectangulars H and S to $S_n$ by dotted line.

Proceeding with a more general description of FIGURE 1 there is first a clock H providing for the time scale and being controlled by a constant speed motor M (FIG. 1).

Selectors $S_1$, $S_2$, . . ., $S_n$ are provided with sliders $S_{11}$, $S_{21}$, . . ., $S_{n1}$ respectively, the angular positions of which are set by means of manually operated knobs $B_1$, $B_2$, . . . $B_n$.

The clock and the selectors constitute a preselection device closing several shot-control circuits at predetermined times. The action of these shot control circuits is prepared by means of a knob P being placed in "on" position when the device is ready for operation, and by a number of partially interlocked relays $K_1$ to $K_8$.

The various shots are initiated by firing units $J_1$ to $J_n$ which are controlled by a firing, or safety knob F, by the preselection device $S_1$ to $S_n$ and by the relays $K_1$ to $K_8$.

The firing of each shot itself is controlled by a sudden discharge of capacitors $C_{21}$ to $C_{2n}$, each capacitor pertaining to a firing unit. The discharge currents of these capacitors flow through the thyratrons $V_1$, $V_2$, . . . , $V_n$ respectively. The firing of each shot itself is carried out conventionally when such firing units are used.

A substantial advantage of the device according to this invention consists of the very high safety factor in the operation of the device, achievable by use of a combination of a number of relays controlling the firing at the different stages of operation.

Such a high safety factor is of considerable importance in the operation of such seismic detonations.

Another significant advantage of the device according to this invention results from its simplicity of manufacture due to the use of revolving contactors of a conventional type and low cost. The firing units may thus be manufactured very simply and at an acceptable price.

Amongst the various possible embodiments of the invention, FIGURE 1 illustrates, by way of example, a particular arrangement of the control, of several firing units.

According to this arrangement a knob P directly controls i.e. energizes relays $K_1$, $K_2$, $K_3$, $K_4$, and $K_5$ for preparing the entire shot control circuit for action.

These relays are simply shown as boxes, and their lead-lines to knob P indicate their respective energization circuit, while the two other lines terminating in each box will be interconnected upon energization of the respective relay. In particular, the several relays provide for the following:

Relay $K_1$ when actuated, turns on the motor M. This motor M drives in rotation a shaft on which are secured the sliders of the three stationary contactors $O_1$, $O_2$, and $O_3$ all pertaining to clock H. There are thirty six contact studs regularly spaced on the peripheral circumference of each contactor $O_1$, $O_2$, and $O_3$, thus realizing thirty six similar intervals each of which may be covered by the slider in, for instance, 5 milliseconds. The thirty six intervals thus provide for a time-scale with 5 milliseconds as unit, and accordingly in the instant case the maximum time delay which may possibly be provided between the first and the last shot is 180 milliseconds.

The contactors $O_2$ and $O_3$ are provided for respectively setting the starting time of a shot cycle (contactor $O_2$) and the end of such cycle (contactor $O_3$).

Relays $K_2$ and $K_3$ are also energized when knob P is in its "on" position, and these relays connect the firing circuits of charges $E$ to $E_n$ with the firing units including the thyratrons $V_1 \ldots V_n$ so that the latter are in position for causing the charges to detonate. Also, as long as relays $K_2$ and $K_3$ are open, any capacitor $C_2$; cannot be discharged over its associated thyratron, because these relays also govern the connection of one thyratron electrode to ground via the charge. This will become apparent when the firing units $J_1$ are described.

The recorder (not shown) sends an order (black triangle) through line A when ready for recording. This line A is normally interrupted by relay $K_4$, but when knob P is in "on" position, relay $K_4$ is energized, thus permitting passage of the order from line A to relay $K_6$.

Relay $K_5$ is also energized when knob P is in its "on" position, and thus relay $K_5$ connects voltage source $G_2$ to the capacitors $C_{21}$, $C_{22}$, $\ldots C_{2n}$ of the firing units $J_1$, $J_2$, $\ldots$, $J_n$, through resistors $R_{11}$, $R_{12}$, and $R_{1n}$ respectively and diodes $D_{11}$, $D_{12}$, $\ldots$, $D_{1n}$ respectively for which provision is made in order to avoid that the capacitor $C_{21}$ of any elementary firing unit be discharged over the capacitors of the other firing units.

Resistors $R_{21}$, $R_{22}$, $\ldots$, $R_{2n}$ in each firing unit provide for a slow discharge of the corresponding capacitors $C_{21}$, $C_{22}$, $\ldots$, $C_{2n}$ in the case where the shot should or did not occur.

The relays $K_2$ and $K_3$ can be substituted by individual relays of the type used for $K_1$, $K_4$, and $K_5$ with a single blade controlling the connection between any of the thyratrons and its associated charge. Alternatively, one can use a single relay with $n$ blades individually controlling these thyratron-charge connections.

The knob P also controls the feeding circuits of relays $K_6$, $K_7$ and $K_8$ which relays cannot be closed at all as long as knob P is on the "off" position. However, these relays $K_6$, $K_7$ and $K_8$ are still not closed when knob P is actuated to its "on" position; this is only a preparatory measure. It is further necessary for closing of these relays that an order from the recorder be received through line A, indicating that it is ready for recording. It is finally necessary that the safety switch F be actuated. The safety switch F thus controls the opening or closing of the shot-circuit in association with relays $K_6$, $K_7$. These relays $K_6$, $K_7$, and $K_8$ have a holding blade, and when they have been energized they remain at their respective "on" position automatically, whereas relays $K_1$, $K_2$, $K_3$, $K_4$ and $K_5$ directly controlled by knob P cannot remain at their respective "on" position when knob P is released i.e. is on the "off" position.

At this point it should be mentioned that all the relays can be simple relays with one energization coil and one or a plurality of contact blades. Alternatively, one can use gating circuits and logic "and" circuits of the conventional type. Reference is made in this respect to R. K. Richards "Digital Computer, Components and Circuits," Vannorstrand 1957.

The relay $K_6$ is energized by a shot order from line A through relay $K_4$ which has to be preliminarily energized by actuation of knob P. Said shot order (black triangle) is received just when the cam for automatic recording control (not shown) actuates a switch (not shown) in series with the energizing circuit of relay $K_6$, comprising the relay $K_4$, which, when energized, merely conects line A with the input of relay $K_6$.

While the above mentioned relays $K_1$ to $K_6$ are being energized, the sliders of the clock H continue their rotation movement. When energized the relay $K_6$ establishes the connection between $v$—$a$ and $x$—$f$, thereby combining the open circuits $abcdf$ and $vmnx$ in a single energizing circuit for relay $K_7$ ($cdfxnmvab$), thus providing for actuation of relay $K_7$ at the moment when the slider of contactor $O_2$ closes said energizing circuit by connection between $b$ and $c$.

Prior to this actuation of relay $K_6$ the safety switch F must be at its "on" position. When actuated the relay $K_7$ closes the circuit connecting the current source $G_1$ to the selectors and also establishes a connection between $p$—$q$ and $g$—$u$, thereby constituting an energizing circuit ($hkpqrtuge$) for relay $K_8$ which will provide for actuation of relay $K_8$ at the moment when the slider of contactor $O_3$ closes said last mentioned circuit by connection between $h$ and $e$.

As soon as relays $K_1$ to $K_7$ have been operated upon in a predetermined order, and all of the preparations for one short cycle have been completed, the actual shots will and can occur only at the predetermined times set for them by the selectors $S_1$ to $S_n$, and the shots are consequently effected in the desired order and at the desired time delay from each other.

The time selected for detonating each charge $E_1$, $E_2$, $\ldots E_n$, of the series has been set preliminarily (i.e. before actuation of knob P or switch F) on the different selectors $S_1$, $S_2$, $\ldots S_n$, corresponding to the control-circuits for detonating said charges. Preselection was made by means of rotating sliders manually actuated by knobs $B_1$, $B_2$, $\ldots B_n$. The contact studs $1$, $2$, $\ldots 36$ of contactors, are connected respectively to studs $1$, $2$, $\ldots 36$ of each of the selectors $S_1$, $S_2$, $\ldots S_n$. For the sake of clarity only the connection between the several studs $1$ of the several contactors is shown.

The order from the recorder came after the latter was ready for operation and thereafter when the slider of contactor $O_2$ of the clock H passes over position $b$ (corresponding to the beginning of the cycle) the shots may begin.

The sliders of the clock continue their revolution, and when the slider of the contactor $O_1$ successively passes over each of the positions corresponding to the settings on each of the selectors $S_1$, $S_2$, $\ldots S_n$, the actuating circuit of the corresponding elementary firing unit is closed and the generated shots thus occur exactly in the predetermined order.

The trigger circuit for each of the firing units comprises a thyratron $V_1$, $V_2$, $\ldots$, $V_n$, which is rendered conductive upon the receiving of a trigger pulse. The trigger pulses are all produced by the generator $G_1$, and they are transmitted via contactor $O_1$, and the selectors $S_1$ to $S_n$, and from there through capacitors $C_{11}$ to $C_{1n}$ respectively, and transformers $T_{11}$, $T_{12}$, $\ldots$, $T_{1n}$ respectively. The order of triggering of the thyratrons depends on the settings of selectors $S_1$ to $S_n$.

Each of the capacitors $C_{21}$, $C_{22}$, $\ldots$, $C_{2n}$ has been previously charged by the current source $G_2$. Upon triggering of the associated thyratron, the capacitors $C_{21}$ to $C_{2n}$ are rapidly discharged through the respectively fired thyratrons $V_1$, $V_2$, $\ldots$, $V_n$, and through the electric detonator for detonating the corresponding charge $E_1$, $E_2$, $\ldots$, $E_n$. The relays $K_2$ and $K_3$ have been closed previously.

At each time when a shot occurs, a corresponding indicating pulse is sent to the recorder, which pulse may be produced for instance by a branch circuit connected to the cathode of the corresponding thyratron ($V_1$, $V_2$, . . ., $V_n$). According to a preferred embodiment of said branch circuits as illustrated by FIGURE 1 the latter may include a resistor of small resistance value $R_{31}$, $R_{32}$, . . ., $R_{3n}$ for deriving a small pulse at each discharge of the thyratron through the resistor $R_{41}$, $R_{42}$, . . ., $R_{4n}$, and a transformer $T_{21}$, . . ., $T_{2n}$. It should be observed that any other branch circuit adapted for deriving a pulse from the thyratron discharge may be used for sending an indicating pulse to the recorder. The use of a transformer in such a branch circuit is not necessary.

The pulses obtained at the outlet of each of said branch circuits and corresponding to the firing of the several firing units may be combined in a common circuit comprising a resistor $R_5$ and diodes $D_{21}$ . . . $D_{2n}$ so as to prevent any action of a pulse coming from any given firing unit on the circuit of any other firing unit. A plurality of pulses may be derived if desired from said firing circuits, some of them being usable for controlling the operation of the recorder.

The train of the combined pulses is conveyed to the recorder through lines TB.

While all of the shots are effected, the sliders of the clock H still continue their common revolution up to the moment when the slider of the contactor $O_3$ reaches the position $e$ which indicates the end of the shot cycle. At this moment the energizing circuit of the relay $K_8$ (hkpqrtuge) is closed, the connections $p$—$q$ and $g$—$u$ resulting from the previous energization of relay $K_7$, and relay $K_8$ de-energizes all the other relays, thereby cutting off the shot circuit and preventing occurrence of a new cycle. Since the preliminary energization of relay $K_7$ is necessary for establishing the connection between the circuits gehkp and qrtu it is apparent that the relay $K_8$ may only be actuated after the relay $K_7$ has been energized. In other words, relay $K_8$ is prepared for action upon energization of relay $K_7$ at the commencing of a cycle.

The relay $K_8$ is a holding relay as stated and will be de-energized only when the knob P is released i.e. placed in "off" position.

Time-spaced shots may thus be effected in any desired combination and with optimum safety due to the position for the various relays and their mutual dependence.

It must be understood that any additional dependence of the relays may be provided by any one skilled in the art without departing from the scope of this invention. For instance, relays $K_2$ and $K_3$ controlling the connection between the electric detonator and the outlet of the thyratron $V_1$, $V_2$, . . ., $V_n$ may receive orders from knob F and/or knob P so as to secure additional safeness.

Another preselection arrangement may also be used such as, for instance, that illustrated in FIG. 2 wherein twelve studs-contactors of the current commercial type are used in lieu of thirty six studs-contactors.

In such an arrangement the time-scale is given by three such contactors of the clock H ($O_{11}$, $O_{12}$, and $O_{13}$) each having twelve studs, the studs of $O_{11}$ being numbered from 1 to 12, that of $O_{12}$ from 13 to 24 and that of $O_3$ from 25 to 36. Another contactor $O_{10}$ also of the twelve stud-type is rotated via gear means at the revolving speed the preceding contactors. The studs of contactor $O_{10}$ are connected in three groups of four studs each corresponding to three equal circumferential sectors used for effecting a selection between the preceding contactors $O_{11}$, $O_{12}$, and $O_{13}$ (see FIGURE 2).

The contactor $O_2$ again gives the starting point of the shot cycle and the contactor $O_3$ gives the end point of the shot cycle and they are similar to those contactors shown in FIGURE 1.

The preselection assembly ($S_1$, $S_2$, . . ., $S_n$) of each firing unit also comprises three selectors $B_{11}$, $B_{12}$, and $B_{13}$, each stud of which is connected to a corresponding stud of contactors $O_{11}$, $O_{12}$, and $O_{13}$, having the same reference number. For sake of clarity only, the connection between studs 9, 21 and 33 are shown.

All the selectors $S_1$, $S_2$, . . ., $S_n$ have the homologeous studs of their contactors $B_{11}$, $B_{12}$, and $B_{13}$, connected in parallel. The choice between the selectors is effected by means of a manually operated master selector $B_{10}$ comprising three studs, each for placing one (and one only) of the selectors $B_{11}$, $B_{12}$, or $B_{13}$ in circuit, thus providing a means for closing any shot control circuit for detonating one of the $n$ charges.

The preselection for each group of shots may also be effected by means of a switch board with connection plugs wherein the plug-system is equivalent to the sliding contact system of the above described arrangement. However, the setting of the individual shot times cannot be effected so quickly with a switch board than by means of contactors with revolving sliders. Accordingly, the use of the latter will constitute a preferred embodiment of the device according to this invention.

The invention is not limited to the embodiments described above but all changes and modifications thereof not constituting departments from the spirit and scope of the invention are intended to be covered by the following claims:

We claim:

1. A device for carrying out a series of shots by detonating charges at predetermined time intervals each of which is a multiple of a predetermined time unit, comprising: a clock including at least one contactor provided with a revolving slider and stationary studs separated from each other by an angular interval corresponding to the angle covered by the slider in one time unit, said slider making successively contact with said studs, said clock further including means for revolving said slider at a constant speed; selector means for independently setting the selected shot time of each shot of the series, said selector means comprising at least one contactor for each charge and being provided with a revolving slider and fixed studs; electrical firing means for said charges; an electric current source; controllable electric circuit means for connecting each slider of a contactor of the clock to said current source; means for individually connecting each slider of said selector means to said current source; means for deriving a firing signal for each charge from said last mentioned means, and for feeding such signal to said firing means; and means for connecting each stud of each contactor of the clock to the corresponding studs of the contacts of said selector means.

2. A device according to claim 1 wherein said firing means comprises a plurality of firing units each of which is associated to a separate explosive charge and each unit comprises a thyratron, a first capacitor connected to said current source, a transformer connecting said first capacitor to the control grid of said thyratron, a second capacitor connected to one main electrode of said thyratron; a second electric current source; each unit further including a resistor and a diode connected for charging said second capacitor from said second source, and an electrical detonator connected to the other main electrode of said thyratron and receiving the discharge current from said second capacitor when said thyratron is triggered by said firing signal.

3. A device according to claim 1 wherein said firing means comprises a plurality of firing units each of which is associated to a separate explosive charge and each unit comprises a first capacitor connected to said current source, a thyratron which is made conductive by said effective firing signal on its grid and generated by the discharge of said first capacitor, a first transformer interconnecting said first capacitor and said grid and transmitting said firing signal, a second capacitor connected to one main electrode of said thyratron, a second current source connected for charging said second capacitor, an electrical detonator connected to the other main electrode of said thyratron and receiving the current discharge from said second capacitor when said thyratron is rendered conductive, a branch circuit for recording purposes connected to the said other main electrode of said thyratron and including (*a*) a transformer receiving pulse produced by the discharge of said second capacitor when said thyratron is fired (*b*) at least one resistor and (*c*) a diode provided for avoiding the transmission of said last-mentioned pulse to other units; and circuit means interconnecting the recorder and all of said branch circuits of said units.

4. A device for carrying out a series of shots by detonating charges at predetermined time intervals each of which is a multiple of a predetermined time unit, comprising: a clock including at least one contactor provided with a revolving slider and stationary studs separated from each other by an angular interval corresponding to the angle covered by the slider in one time unit, said slider making successively contact with said studs, a second contactor in said clock provided with a revolving slider and having a stud corresponding to the time origin of the shots series, a third contactor in said clock also provided with a revolving slider and a stud corresponding to the end of the shots series, said clock further including means for revolving jointly the sliders of said contactors of the clock at a constant speed; selector means for independently setting the selected time for each shot of the series, said selector means comprising at least one contactor for each charge and being provided with a revolving slider and fixed studs; electrical firing means for each charge and including a capacitor to be discharged for firing the charge; an electric current source; control means for connecting the slider of said first contactor of the clock to said current source; a control circuit including slider and studs of the said second contactor of said clock for actuating said control means; means for connecting each slider of said selector means to said current source; means for deriving trigger signals for said capacitor discharge from said last mentioned connection means; means for connecting each stud of said first contactor of the clock to the corresponding studs of the contactors of said selector means; controllable means for disconnecting the slider of the first contactor of the clock from said current source; and means responsive to the connection of one stud and the slider of said third contactor of the clock, for actuating said controllable means.

5. A device according to claim 4 in association with a recorder, further comprising a first relay controlling said revolving means common to the sliders of the contactors of the clock; relay means controlling the connection between said capacitors and said charges; a second relay controlling the closure of the shot cycle controlling line transmitting orders from said recorder; circuit means for individually charging said capacitors; a second current source; a third relay controlling the connection of said circuit means charging the capacitors to said second current source, said relays and said relay means being controlled for energization by a first switch; said control circuit including a fourth relay responsive to a transmitted order through said second relay; said control means including a fifth relay responsive to said second contactor through said fourth relay, said controllable disconnecting means including a sixth relay enabled by energization of said fifth relay and controlled by said third contactor for cutting off the shot circuit at the end of the shots series.

6. An apparatus for setting off successive shots by releasing electric firing mechanism according to a program corresponding to intervals of time chosen in advance and of duration which are multiples of a unit of time chosen in advance, comprising a clock mechanism giving a time scale, said apparatus comprising at least one rotary slider for engaging stationary contacts; selector means for setting up chosen times for each of the shots or groups of successive shots comprising in association with each firing means a plurality of fixed contacts and a slider contact contacting only one contact at a time of each plurality of fixed contacts, means for connecting the slider of each contactor of the clock mechanism to a source of electric current, means for connecting the fixed contacts of each of said selector means to the source of electric current through the intermediary of a corresponding firing mechanism, and means to connect each fixed contact of the contactor of the clock mechanism to each fixed contact of the selector means respectively.

References Cited in the file of this patent
UNITED STATES PATENTS

| | | |
|---|---|---|
| 2,546,686 | Bickel et al. | Mar. 27, 1951 |
| 2,616,000 | Beautense | Oct. 28, 1952 |
| 2,683,786 | Turechek | July 13, 1954 |
| 2,956,226 | Vogt et al. | Oct. 11, 1960 |